_2,806,790_

HYDROLYSIS OF FISH MATERIALS

Robert H. Bedford, San Pedro, Calif.

No Drawing. Application May 7, 1954,
Serial No. 428,363

11 Claims. (Cl. 99—7)

This invention relates to the treatment of fish and has particular reference to a process for producing water soluble animal food products from fish viscera, fish offal, and whole fish, and to the product resulting therefrom.

Specifically this invention relates to the enzymatic production, from viscera, offal or whole fish and mixtures thereof, of water soluble proteins and their constituent compounds; hydrolytic products of the nucleic acids; water soluble vitamins; and separation of all of these from the bone and oil and other non-hydrolyzable solid material, the resulting hydrolysate, containing 10% to 30% total solids, remaining free flowing when concentrated to 50% to 65% total solids.

The viscera, offal or whole fish may consist of the following:

(1) Raw tuna viscera. This consists of the whole of the alimentary canal, the pancreas, the ceca, and includes the liver and all other organs of the body cavity;

(2) Fresh or frozen fresh whole fish or offal. The offal consists of heads, tails and adhering muscle, the viscera, and damaged whole fish not used for human consumption.

(3) Heated whole fish or offal. This consists of fresh or frozen fresh whole fish or offal whichh as been heated to a temperature high enouh to destroy all enzyme action, and for the purposes of this invention includues the acid precipitate of fish press juice.

Throughout the specification and claims herein, the individual member of items (2) and (3) and mixtures thereof are broadly referred to as "fish materials," this term being distinguished from and not including the separated fish viscera. By "tuna" is meant tuna and tuna-like fish such as albacore, skipjack, bluefin, yellowfin, yellowtail, and bonita.

In fresh fish enzymatic activity is indicated by post mortem changes resulting in stiffening or rigor mortis of the tissues which finally become soft, the sequence of reactions being conditioned by the acid condition of the cells of the various tissues. Simultaneously with these conditions contaminating microorganisms decompose the cellular material of the body and viscera, and finally destroy its nutritive properties. In heated fish or offal the enzymes are destroyed and no further changes are evident, but upon cooling contaminating micro-organisms cause rapid decomposition.

The customary manner of preparing whole fish or offal for nutritional purposes is by direct or indirect heating. When these contain much oil they are generally given a preliminary treatment of steam cooking before being pressed to extract the oil along with the highly nutritional juice or stick water, and small particles of flesh and bone. The oil is separated by centrifuging. The press juice may be discarded or concentrated to about 50% total solids and used for animal nutritional purposes. When being prepared for concentration the press juice may be acidified to precipitate certain of the proteins. This precipitate is heat dried to a meal in a manner similar to that for the drying of whole fish or offal.

Feeding tests have shown that the nutritional value of heat dried meal may be seriously impaired by reason of the damage done to the proteins containing arginine, glycine, lysine, methionine and threonine.

Many attempts have been made to overcome this disadvantage of the conventional process, but apparently without complete success. It is accordingly one of the principal objects of this invention to provide a process for the production of animal food products from fish without substantial destruction of the nutritional values thereof.

Another object of this invention is to provide a process for the production of an aqueous solution of the constituents of fish tissues and having the highest nutritional value, through hydrolysis of the tissues by utilization of the natural enzymes thereof at a comparatively low temperature and in the absence of preservatives.

Another object of this invention is to provide a process for the treatment of raw tuna viscera and combinations with the viscera of fresh, frozen fresh or heated whole fish and/or offal, wherein the hydrolytic enzyme effect of the raw tuna viscera is greatly increased by proper control of the hydrogen ion concentration at different periods of hydrolysis and of temperature, time and quantities of water.

Another object of this invention is to provide a novel water soluble product of such a process of hydrolysis, which product remains fluid even when concentrated to 50–65% total solids.

Another object of this invention is to provide a method for enhancing the hydrolytic enzyme effect of raw tuna viscera when used in a process of the character described, by the addition thereto of certain inorganic and organic chemical compounds.

Another object of this invention is to provide a process for the production of a highly nutritional animal food product from fresh, frozen fresh whole fish and offal, singly or in combination, in the absence of raw tuna viscera.

Another object of this invention is to provide a process for the treatment of whole fish, offal and viscera to enhance the digestibility thereof by solubilizing the tissues to water soluble whole proteins and their constituent compounds, releasing water soluble vitamins which may be chemically and physically bound to other compounds, and separating therefrom the oil and bones and solid non-hydrolyzable material, rendering the soluble tissue products more readily available for absorption in the intestines.

Another object of this invention is to provide a novel water soluble fish product consisting of a fluid concentrate containing 50–65% total solids which is preserved from micro-organic decomposition by reason of the osmotic property of its soluble constituents, and which consequently retains its nutritive properties for indefinite periods of time without the necessity for elaborate storage precautions.

Another object of this invention is to produce an oil from heated or unheated fresh or frozen fresh whole fish, offal or viscera, free of fatty acids and without discoloration, concurrently with enzymatic hydrolysis.

Other objects and advantages of this invention it is believed will readily apparent to those skilled in the art from the following detailed description of preferred embodiments thereof.

In carrying out the process of this invention, raw tuna viscera alone, or a mixture of raw tuna viscera and a fish material selected from one or more of heated, fresh or frozen fresh whole fish or offal, or the acid precipitate of fish press juice is ground or disintegrated by means of a hammer mill, meat grinder or disintegrator. Sufficient water to form a thick, viscous slurry is added. The water content may vary from 15 to 100 parts; based on 100 parts by weight of the weight of the viscera and fish material. The mixture is pumped to a steam-jacketed digestion kettle wherein the temperature is gradually increased to about 50° C. with agitation of the mixture, the agitation being continued throughout the entire digestion period. During this initial raising of the temperature the hydrogen ion concentration is adjusted to a point within the range of pH 5.5 to 6.0 by the addition of an acid such as concentrated sulfuric, hydrochloric or phosphoric, if necessary, and hydrolysis is continued for about 30 minutes.

The first period of the hydrolysis, which is a mild acid digestion, is followed by a second period of hydrolysis consisting of mild alkaline digestion. That is, after the initial period of about 30 minutes, the hydroxyl ion concentration is increased to within the range pH 7.8 to 8.0 and maintained therein by the addition of a suitable alkaline compound such as the hydroxides of sodium, potassium, calcium or ammonia; the sodium, potassium or ammonium carbonates or bicarbonnates; or the alkaline phosphates of sodium, potassium, or ammonium. Digestion is continued for a period of 1 to 4 hours, or until the bones are cleanly separated from the organic matter. This time period necessarily depends upon the quantity of whole fish and offal added, which varies with the ratio of organic matter to raw tuna viscera.

Large bones and other solid extraneous material which is not hydrolyzable is eliminated from the mixture at this stage, by discharging the mixture from the kettle through a revolving screen, and thence through a basket centrifuge to take out the finely divided bone particles which have passed through the screen. The bones are saturated with hydrolysate and are dried for animal feed. A primary purpose for the removal of the bone particles at this stage is to lessen as much as possible adsorption of the enzymes and the accompanying reduction of the rate and extent of hydrolysis in the following digestion period.

The partially hydrolyzed mixture from the basket centrifuge is pumped to another digestion tank or kettle, preferably passing en route through a heat exchanger to again bring the temperature to about 50° C. The pH is maintained between 7.8 to 8.0 and the temperature at about 50° C. until hydrolysis is complete, an additional period of from 6–18 hours, although the time required may be less or even more, depending upon the feed material.

The hydrolyzed material is then pumped through a high speed centrifuge to extract the oil and soap if necessary. Some fresh whole fish and offal such as the pilchard (sardine), mackerel, and herring, contain considerable quantities of oil which is extracted by the high speed centrifuge. Other types of fish such as the flatfish, halibut, sole, etc., contain very little oil in the tissues, and centrifuging at this stage is not necessary. In certain other fish such as anchovy, which contain considerable oil, oxidation of the glycerides to fatty acids is extremely rapid, and frequently centrifuging is necessary to extract the soaps to produce a refined product.

The refined hydrolyzed material may be used in this condition by maintaining the alkalinity or by adjusting the pH to about 4.0 and, either in the alkaline or acid condition, it may be concentrated to 50 to 65% total solids, depending upon the feed material used. The concentrated form is preferred since it is in a more suitable form for storage, for transportation and for mixing with other feed substances for animal nutrition.

Concentration may be carried out in any manner familiar to those skilled in the art. The preferred method is to use a three-stage evaporator, the temperature in the first stage being near the boiling point, the second and third stages being under partial vacuum and at lower temperatures, with the final temperature being about 135° F.

The temperature of digestion is quite critical and should not be varied more than 2 or 3 degrees either side of 50° C. Lower temperatures require longer digestion periods with the danger of microbial decomposition, while higher temperatures lead to denaturization of the enzymes.

The control of the pH during the two digestion periods is an important feature of the invention. It has been found experimentally that at hydrogen ion concentrations of pH 4.5 and higher, which activate proteolytic enzymes such as pepsin, raw tuna viscera is hydrolyzed only to the extent that is can be concentrated to about 45% total solids. Even at this concentration it is so viscous that it is difficult to pump. During this type of acid digestion the other hydrolytic enzymes functioning at lower hydrogen ion concentrations are destroyed.

When, however, the hydrogen ions are controlled within the range from pH 5.5 to 6.0 other enzymes permit a partial hydrolysis of the tissue cells without inactivating enzymes which come into operation as the pH is gradually changed to the final range of 7.8 to 8.0.

As a result of this preliminary partial hydrolysis the tissue cells are disintegrated to finely divided particles providing an enormous increase in surface area for the action of hydrolytic enzymes subsequently brought into play at the higher pH range.

By this means the rate and efficiency of the various enzymes made use of in the process are greatly increased. This permits large quantities of fish material in be hydrolyzed to the point where the resulting product can be concentrated to 50% to 65% total solids and still remain free flowing. Under these conditions the hydrolysate from the raw tuna viscera used alone may be concentrated to at least 65% total solids, and when the greatest quantity of fish material is added to the tuna viscera the resulting hydrolysate may be concentrated to at least 50% total solids and remain free flowing.

The following is a specific example of a preferred process in accordance with the invention:

EXAMPLE 1

4400 pounds of raw tuna viscera and 4300 pounds of cooked tuna offal were added to each other in about equal proportions and passed through a meat grinder. The ground mixed material fell into a hopper to which 3000 pounds of water were gradually added, and the whole mixture was pumped to a steam jacketed kettle. Agitation of the mixture was started at the beginning of the filling of the kettle and it was maintained during the whole of the digestion period. When the kettle was filled, steam was turned into the jacket and the mixture heated to 50° C. This temperature was maintained for the primary period of digestion. The hydrogen ion concentration was gradually changed (over a period of about 1 hour) from pH 6.0 to pH 8.0 with 50% sodium hydroxide solution. The total primary digestion was for a period of 4 hours. At the end of this period the bones were separated from the soluble and finely suspended organic matter and the oil by pumping the mixture from the kettle first through a revolving screen to take out large-sized bone particles and then through a basket centrifuge operating at 2000 R. P. M. to remove the fine bone particles. The bone-free material was then pumped to another tank through a heat exchanger to raise the temperature again to 50° C. for a continued digestion period of 18 hours. This temperature was maintained by recirculation through the heat exchanger. At the end of the secondary period the hydrolysate was rapidly heated to 80° C. by means of the heat exchanger and immediately passed through a high speed De Laval centrifuge to separate the oil from the aqueous solution.

EXAMPLE 2

The offal used was the acidified precipitate obtained from heated press juice of steam cooked mackerel and tuna.

2750 pounds of raw tuna viscera and 2220 pounds of the press juice precipitate were added to each other and passed through a meat grinder. The ground mixed material fell into a hopper to which 1850 pounds of water were gradually added, and the whole mixture pumped to a steam jacketed kettle. The procedure outlined in Example 1 was then followed.

The proportions of the ingredients used are not critical, at least insofar as the fish materials are concerned. While a ratio of viscera to heated fish material of about 1:1 has been used, viscera alone has also been used, and the ratio of viscera to unheated fish material may be of the order of 1:5. It will be readily understood that substantially higher concentrations of the non-viscera fish material will require longer digestion periods. Sufficient water should be used to permit the hydrolysis to take place and, as indicated may vary considerably, the practical working limits being 15 to 100 parts per 100 parts by weight of viscera and fish materials.

The following specific examples illustrate feed mixtures satisfactorily processed in accordance with the process of this invention, the proportions being on a weight basis:

EXAMPLE 3

| | Parts |
|---|---|
| Raw tuna viscera | 750.0 |
| Water | 190.0 |

EXAMPLE 4

| | |
|---|---|
| Raw tuna viscera | 500.0 |
| Heated tuna offal | 500.0 |
| Water | 335.0 |

EXAMPLE 5

| | |
|---|---|
| Raw tuna viscera | 500.0 |
| Heated tuna offal | 750.0 |
| Water | 420.0 |

EXAMPLE 6

| | |
|---|---|
| Raw tuna viscera | 500.0 |
| Unheated whole sardines | 1000.0 |
| Water | 503.0 |

EXAMPLE 7

| | |
|---|---|
| Raw tuna viscera | 125.0 |
| Unheated sardine offal | 625.0 |
| Water | 268.0 |

EXAMPLE 8

| | |
|---|---|
| Raw tuna viscera | 2445 |
| Mackerel offal | 12222 |
| Water | 4900 |

It has been found that the hydrolytic enzyme action of the viscera is enhanced by the addition of certain chemical compounds. For example, it has been discovered that the addition of a mixture of an inorganic salt such as sodium, potassium or calcium chloride and an organic base such as urea, thiourea or guanidine to the water at the time of grinding the fish mixture shortens the time necessary for digestion and permits an increase in the quantity of fish material which may be added to the raw tuna viscera.

The quantity of chloride salt employed in the process depends on the previous treatment of the fish. Frequently fish are flumed by means of sea water from the vessel to the plant. At other times they are held in chlorinated sea water or brine for some hours prior to canning or reduction to metal and oil. In both cases some sodium or calcium chloride is taken up by the carcass, and this obviously conditions the quantity of the chloride to be used. Satisfactory results have been obtained when the quantity of sodium chloride added is 0.25 to 1 part, or equivalent weight of potassium or calcium chloride, to 100 parts by weight of the fish material. Sea water may be substituted for sodium chloride. In this case the quantity is of course calculated on the basis of its sodium chloride content.

The quantity of urea or equivalent used depends on the quality of the fish, and varies from 0.25 to 0.75 part to 100 parts by weight of the fish material.

These chemicals are very effective in aiding disintegration of the organic matter, a fact which is particularly noticeable during the preliminary digestion period. The result is an aqueous suspension of finely divided particles which provides a large surface area having a considerable effect on the course of subsequent hydrolytic enzyme action.

The following specific examples illustrate the effect of the addition of the chemical compounds to the feed materials in the process of this invention:

EXAMPLE 9

*Reducing digestion period*

| | No Chemicals | With Chemicals |
|---|---|---|
| Raw Tuna Viscera grams | 750.0 | 1,251.0 |
| Water do | 190.0 | 420.0 |
| Sodium chloride do | | 11.2 |
| Urea do | | 6.3 |
| Digestion hours | 6 | 2 |

EXAMPLE 10

*Increasing quantity of unheated whole fish*

| | No Chemicals (ratio, 1:2) | With Chemicals (ratio, 1:4) |
|---|---|---|
| Raw Tuna Viscera grams | 500.0 | 234.0 |
| Unheated Whole Sardines do | 1,000.0 | 936.0 |
| Water do | 503.0 | 390.0 |
| Sodium chloride do | | 10.5 |
| Urea do | | 5.9 |
| Digestion hours | 6 | 5 |

EXAMPLE 11

*Increasing of quantity of unheated offal*

| | No Chemicals (ratio, 1:5) | With Chemicals (ratio, 1:10) |
|---|---|---|
| Raw Tuna Viscera grams | 125.0 | 60.0 |
| Unheated Offal do | 625.0 | 600.0 |
| Water do | 268.0 | 600.0 |
| Calcium Chloride do | | 5.8 |
| Urea do | | 3.3 |
| Digestion hours | 10 | 5 |

EXAMPLE 12

*Increasing the quantity of heated offal*

| | No Chemicals (ratio, 1:1) | With Chemicals (ratio, 1:2.6) |
|---|---|---|
| Raw Tuna Viscera grams | 500.0 | 782.0 |
| Tuna Offal do | 500.0 | 2064.0 |
| Water do | 335.0 | 1290.0 |
| Sodium Chloride do | | 34.6 |
| Urea do | | 19.2 |
| Digestion hours | 5 | 5 |

A satisfactory hydrolysate of raw fish materials, i. e., fresh, frozen fresh whole fish or offal when used alone without raw tuna viscera could not be obtained even after a digestion period of 24 hours, when for all practical purposes the hydrolytic action stopped. However, with addition of the chemical compounds to the aqueous feed materials a satisfactory hydrolysate could be obtained within a period of 7 to 10 hours, depending on the condition of the fish material.

The following are specific examples of feed materials found to yield satisfactory results when treated in accordance with the process of this invention:

EXAMPLE 13

| | | |
|---|---|---|
| Anchovy | grams | 812.0 |
| Water | do | 812.0 |
| Sodium chloride | do | 7.30 |
| Urea | do | 4.1 |
| Digestion hours | | 10 |

EXAMPLE 14

| | | |
|---|---|---|
| Anchovy | grams | 326.0 |
| Water | do | 326.0 |
| Calcium chloride | do | 3.6 |
| Urea | do | 1.6 |
| Digestion hours | | 7 |

EXAMPLE 15

| | | |
|---|---|---|
| Menhaden | grams | 74.5 |
| Water | do | 74.5 |
| Sodium chloride | do | 0.7 |
| Urea | do | 0.4 |
| Digestion hours | | 7 |

EXAMPLE 16

| | | |
|---|---|---|
| Jack Mackerel | grams | 603.0 |
| Water | do | 603.0 |
| Sodium chloride | do | 5.4 |
| Urea | do | 3.0 |
| Digestion hours | | 10 |

EXAMPLE 17

| | | |
|---|---|---|
| Herring | grams | 959.0 |
| Water | do | 959.0 |
| Calcium chloride | do | 8.6 |
| Urea | do | 4.8 |
| Digestion hours | | 10 |

EXAMPLE 18

| | | |
|---|---|---|
| Sardine | grams | 391.0 |
| Water | do | 391.0 |
| Calcium chloride | do | 1.0 |
| Urea | do | 2.0 |
| Digestion hours | | 10 |

While preferred embodiments of this invention have been described in detail, it is to be understood that the invention is not so limited, but is of the full scope of the appended claims.

I claim:

1. In a process for the production of an animal food product, the steps comprising mixing together water, raw tuna viscera, and fish materials, adding to the mixture a minor proportion of (1) a salt selected from the group consisting of sodium chloride, potassium chloride and calcium chloride and of (2) a compound selected from the group consisting of urea, thiourea and guanidine, heating said mixture of a relatively short period of time while maintaining the pH thereof between 5.5 and 6.0, and continuing said heating while maintaining said pH between 7.8 and 8.0 for a sufficient length of time to hydrolyze said viscera and fish materials.

2. In a process for the production of an animal food product, the steps comprising mixing together water, raw tuna viscera, and fish materials, adding to the mixture a minor proportion of (1) a salt selected from the group consisting of sodium chloride, potassium chloride and calcium chloride and of (2) a compound selected from the group consisting of urea, thiourea and guanidine, heating said mixture at about 50° C. for about 30 minutes while maintaining the pH thereof between 5.5 and 6.0 and continuing said heating at about 50° C. and at a pH of between 7.8 and 8.0 for a sufficient length of time to hydrolyze said viscera and fish materials.

3. In a process for the production of an animal food product, the steps comprising mixing together water, raw tuna viscera, and fish materials, adding to the mixture a minor proportion of (1) a salt selected from the group consisting of sodium chloride, potassium chloride and calcium chloride and of (2) a compound selected from the group consisting of urea, thiourea and guanidine, heating said mixture at about 50° C. for about 30 minutes while maintaining the pH thereof between 5.5 and 6.0, continuing said heating at about 50° C. and at a pH of between 7.8 and 8.0 for a sufficient length of time to separate the organic fish matter from the fish bones, removing said bones from the mixture, and continuing said heating of the bone-free mixture at the same temperature and pH for a sufficient length of time to hydrolyze said viscera and fish materials.

4. In a process for the production of an animal food product, the steps comprising mixing together water, raw tuna viscera, and fish materials, heating said mixture at a temperature of about 50° C. for about 30 minutes while maintaining the pH thereof between 5.5 and 6.0, and continuing said heating at the same temperature and at a pH of between 7.8 and 8.0 for a sufficient length of time to hydrolyze said viscera and fish materials.

5. In a process for the production of an animal food product, the steps comprising mixing together water, raw tuna viscera, and fish materials, heating said mixture at a temperature of about 50° C. for about 30 minutes while maintaining the pH thereof between 5.5 and 6.0, continuing said heating at the same temperature and at a pH of between 7.8 and 8.0 for a sufficient length of time to separate the organic fish matter from the fish bones, removing said bones from the mixture, and continuing said heating of the bone-free mixture at the same temperature and pH for a sufficient length of time to hydrolyze said viscera and fish materials.

6. In a process for the production of an animal food product, the steps comprising mixing together water, and raw tuna viscera, heating said mixture at a temperature of about 50° C. for about 30 minutes while maintaining the pH thereof between 5.5 and 6.0, and continuing said heating at the same temperature and at a pH of between 7.8 and 8.0 for a sufficient length of time to hydrolyze said viscera.

7. In a process for the production of an animal food product, the steps comprising mixing together water and raw fish materials, adding to the mixture a minor proportion of (1) a salt selected from the group consisting of sodium chloride, potassium chloride and calcium chloride and of (2) a compound selected from the group consisting of urea, thiourea and guanidine, heating said mixture for a relatively short period of time while maintaining the pH thereof between 5.5 and 6.0, and continuing said heating while maintaining said pH between 7.8 and 8.0 for a sufficient length of time to hydrolyze said fish materials.

8. In a process for the production of an animal food product, the steps comprising mixing together water and raw fish material, adding to the mixture a minor proportion of (1) a salt selected from the group consisting of sodium chloride, potassium chloride and calcium chloride and of (2) a compound selected from the group consisting of urea, thiourea and guanidine, heating said mixture at about 50° C. for about 30 minutes while maintaining the pH thereof between 5.5 and 6.0 and continuing said heating at about 50° C. and at a pH of between 7.8 and 8.0 for a sufficient length of time to hydrolyze said fish materials.

9. In a process for the production of an animal food product, the steps comprising mixing together water and raw fish materials, adding to the mixture a minor proportion of (1) a salt selected from the group consisting of sodium chloride, potassium chloride and calcium chloride and of (2) a compound selected from the group consisting of urea, thiourea and guanidine, heating said mixture at about 50° C. for about 30 minutes while maintaining the pH thereof between 5.5 and 6.0, continuing said heating at about 50° C. and at a pH of between 7.8 and 8.0 for a sufficient length of time to separate the organic fish matter from the fish bones, removing said bones from the mixture, and continuing said heating of the bone-free mixture at the same temperature and pH for a sufficient length of time to hydrolyze said fish materials.

10. In a process for the production of an animal food product, the steps comprising mixing together water, raw tuna viscera, and fish materials, adding to the mixture 0.25 to 1 part, per 100 parts by weight of fish material of (1) a salt selected from the group consisting of sodium chloride, potassium chloride and calcium chloride and 0.25 to 0.75 part, per 100 parts by weight of fish material, of (2) a compound selected from the group consisting of urea, thiourea and guanidine, heating said mixture for a relatively short period of time while maintaing the pH thereof between 5.5 and 6.0, and continuing said heating while maintaining said pH between 7.8 and 8.0 for a sufficient length of time to hydrolyze said viscera and fish materials.

11. In a process for the production of an animal food product, the steps comprising mixing together water, raw tuna viscera, and fish materials, heating said mixture at a temperature of about 50° C. for a relatively short period of time while maintaining the pH thereof between 5.5 and 6.0, and continuing said heating at the same temperature and at a pH of between 7.8 and 8.0 for a sufficient length of time to hydrolyze said viscera and fish materials.

References Cited in the file of this patent

UNITED STATES PATENTS

| | | |
|---|---|---|
| 1,550,268 | Kramer et al. | Aug. 18, 1925 |
| 1,642,209 | Kahn | Sept. 13, 1927 |
| 2,560,011 | Trudel | July 10, 1951 |